March 2, 1965 G. G. ENSIGN ETAL 3,171,992
ELECTROMAGNET TYPE OSCILLATING MOTOR
Original Filed Aug. 15, 1952 13 Sheets-Sheet 9
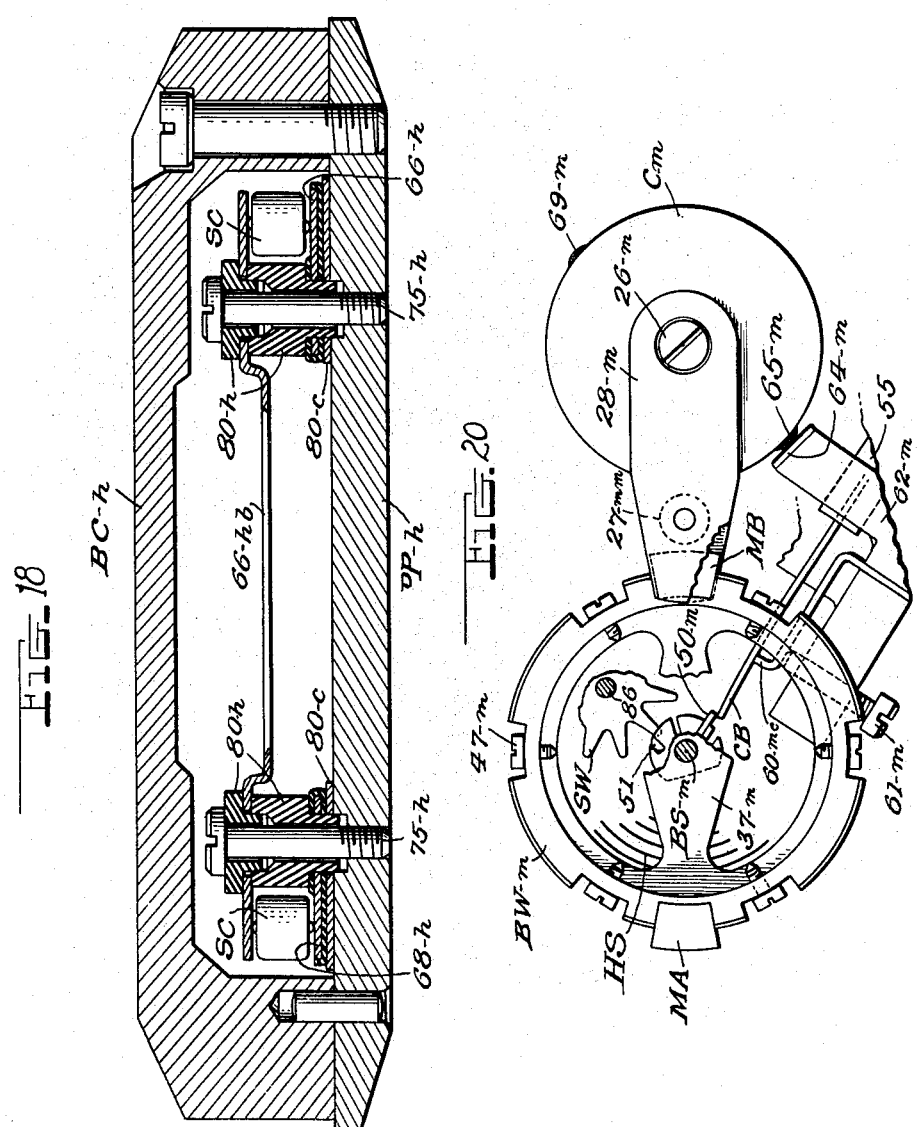
INVENTORS
G. G. Ensign,
G. T. Soper and
O. Lundahl

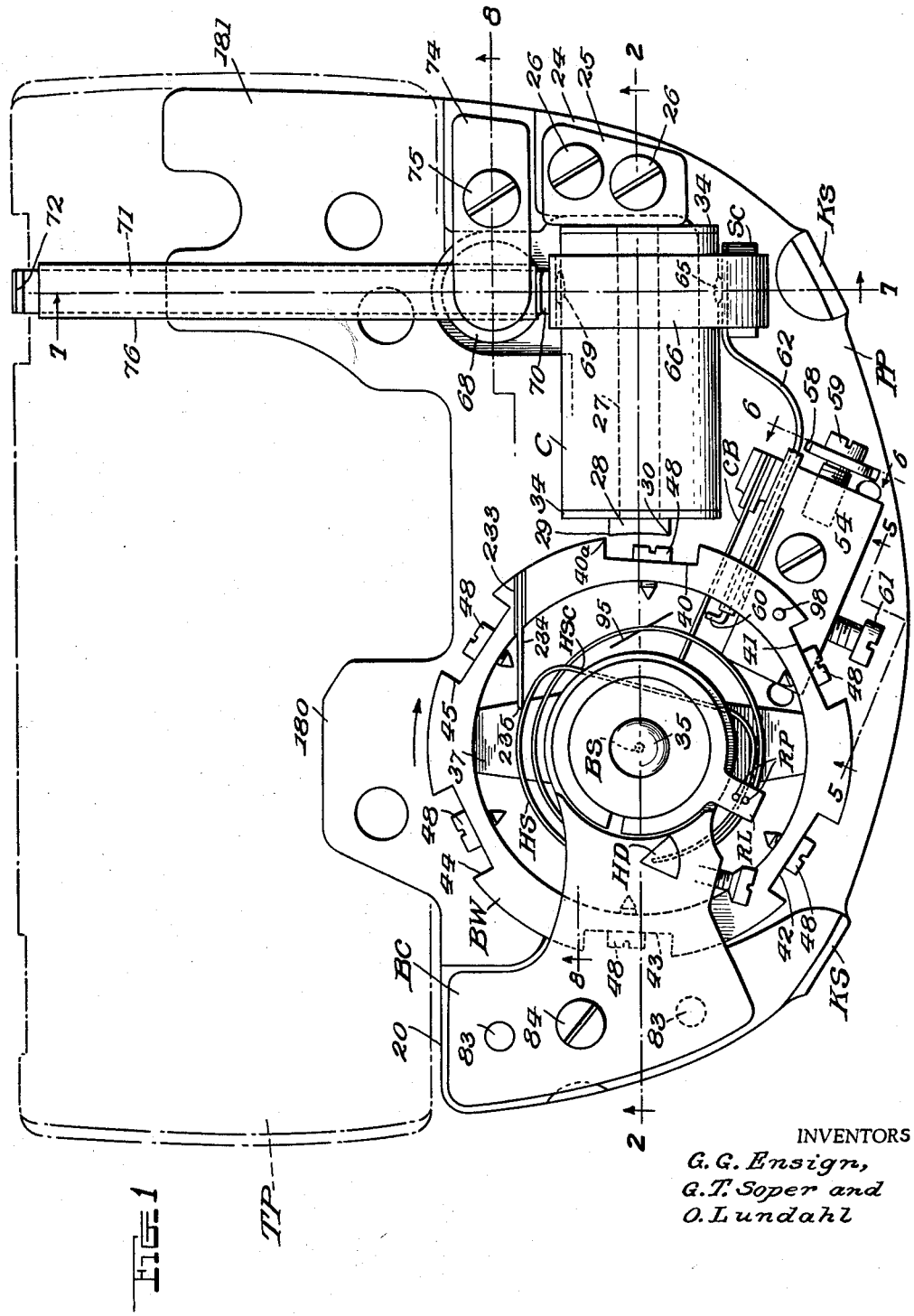

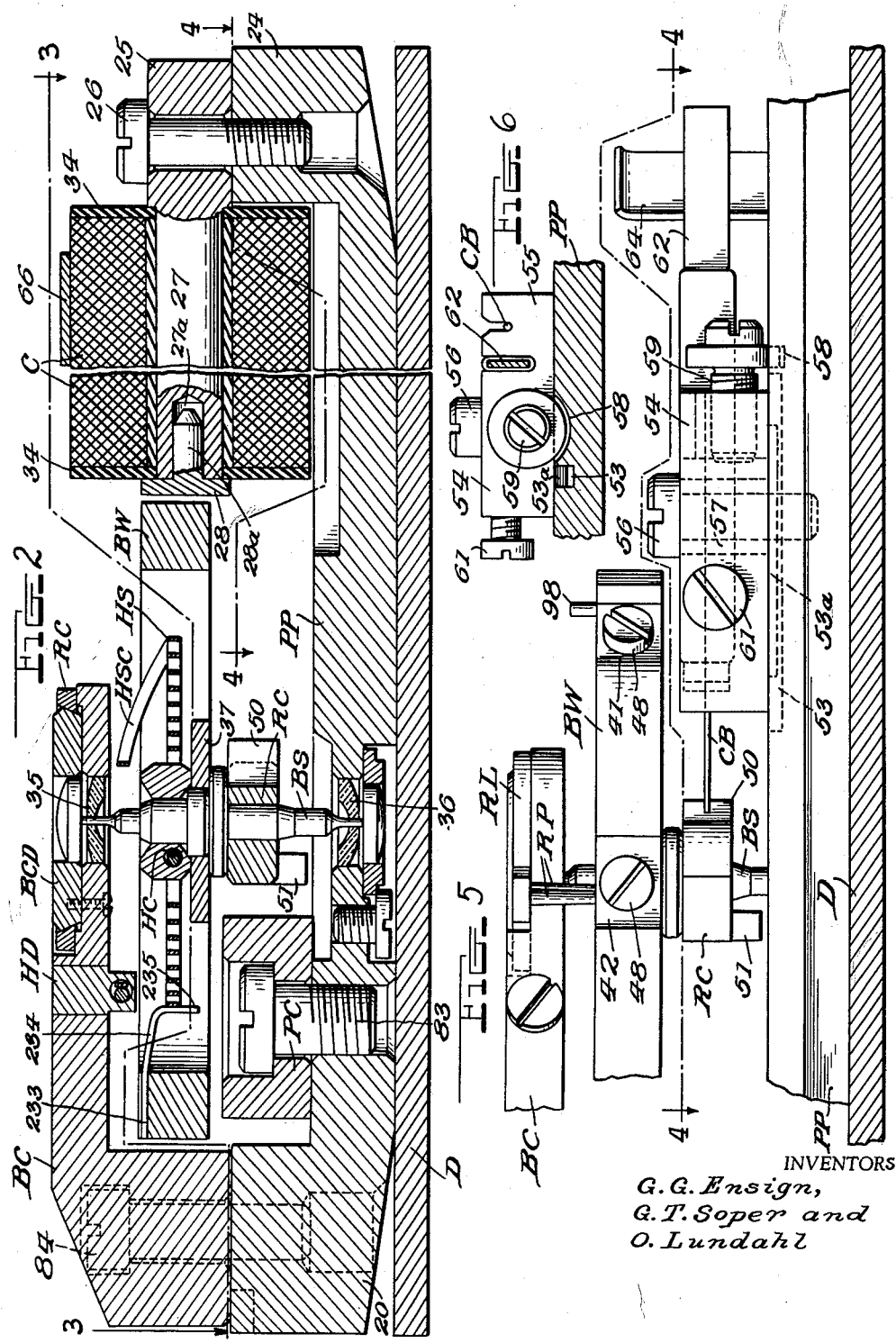

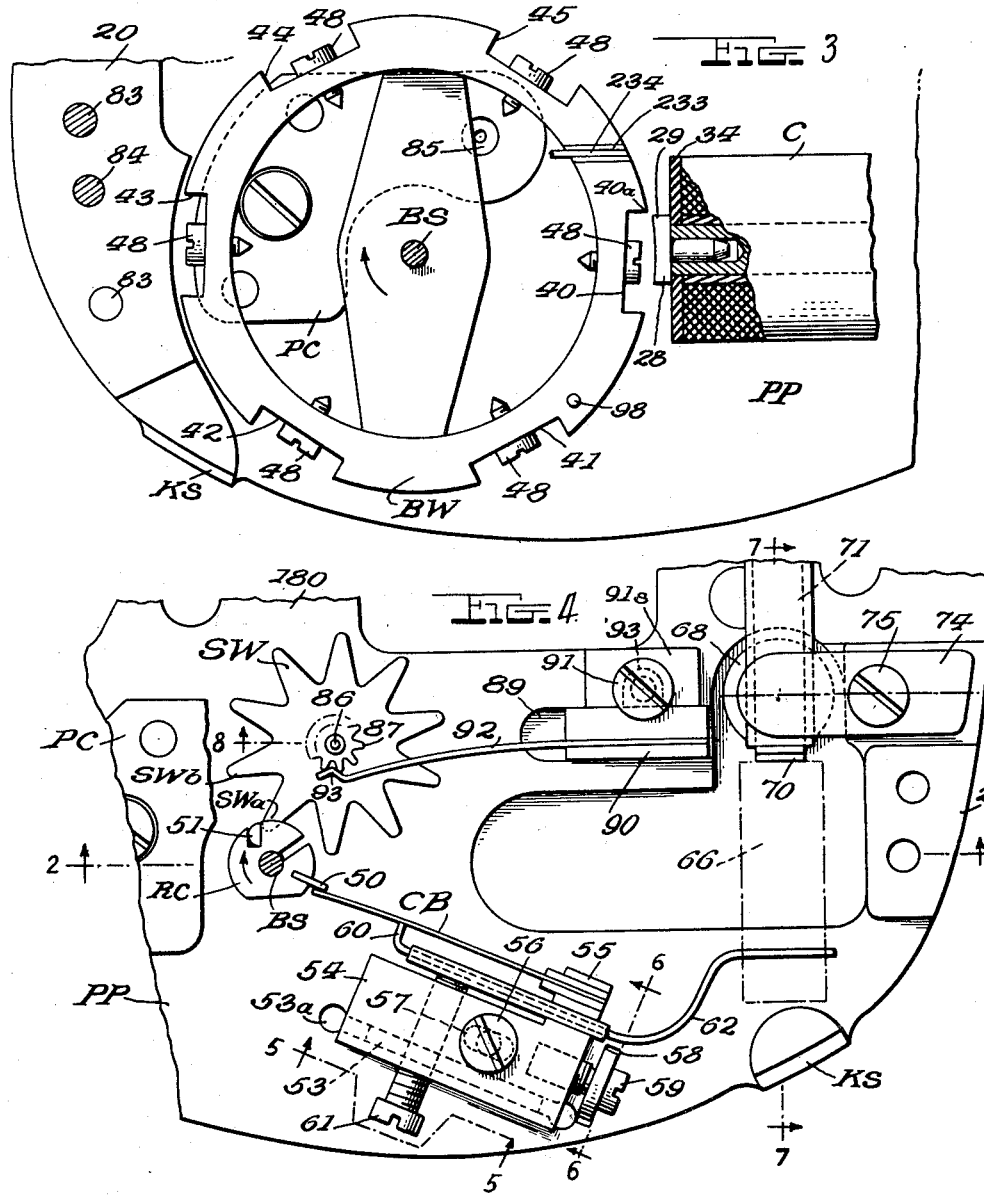

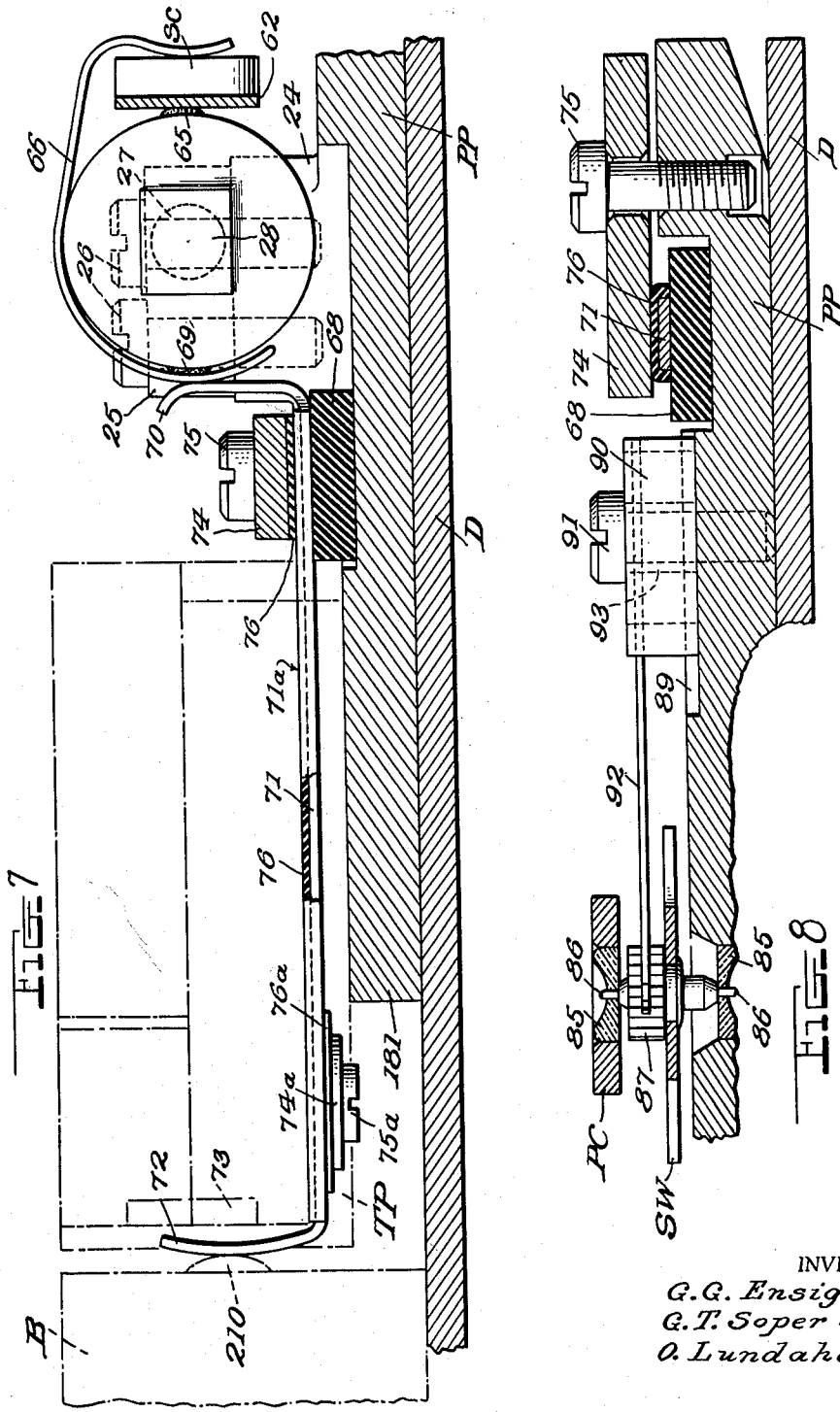

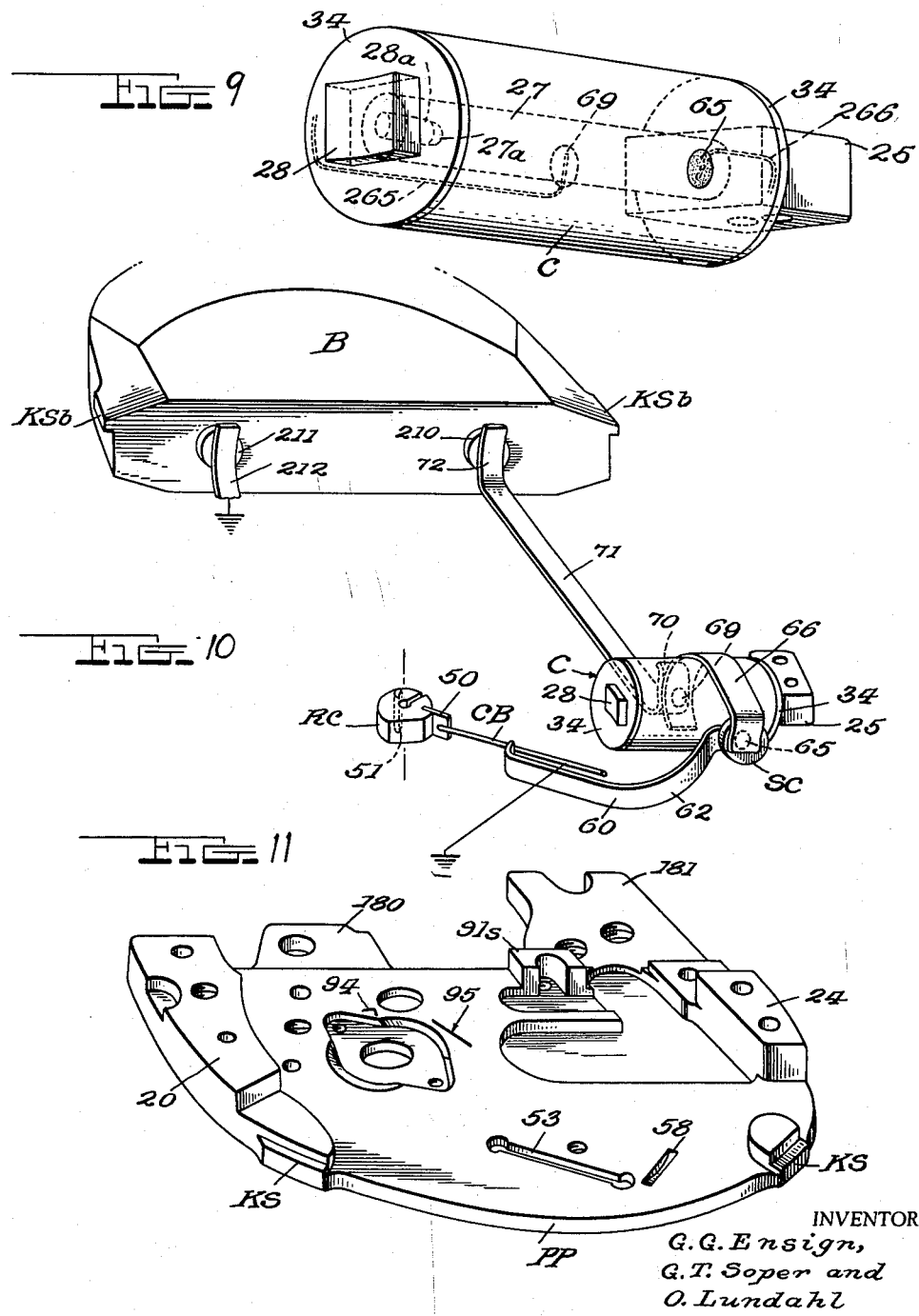

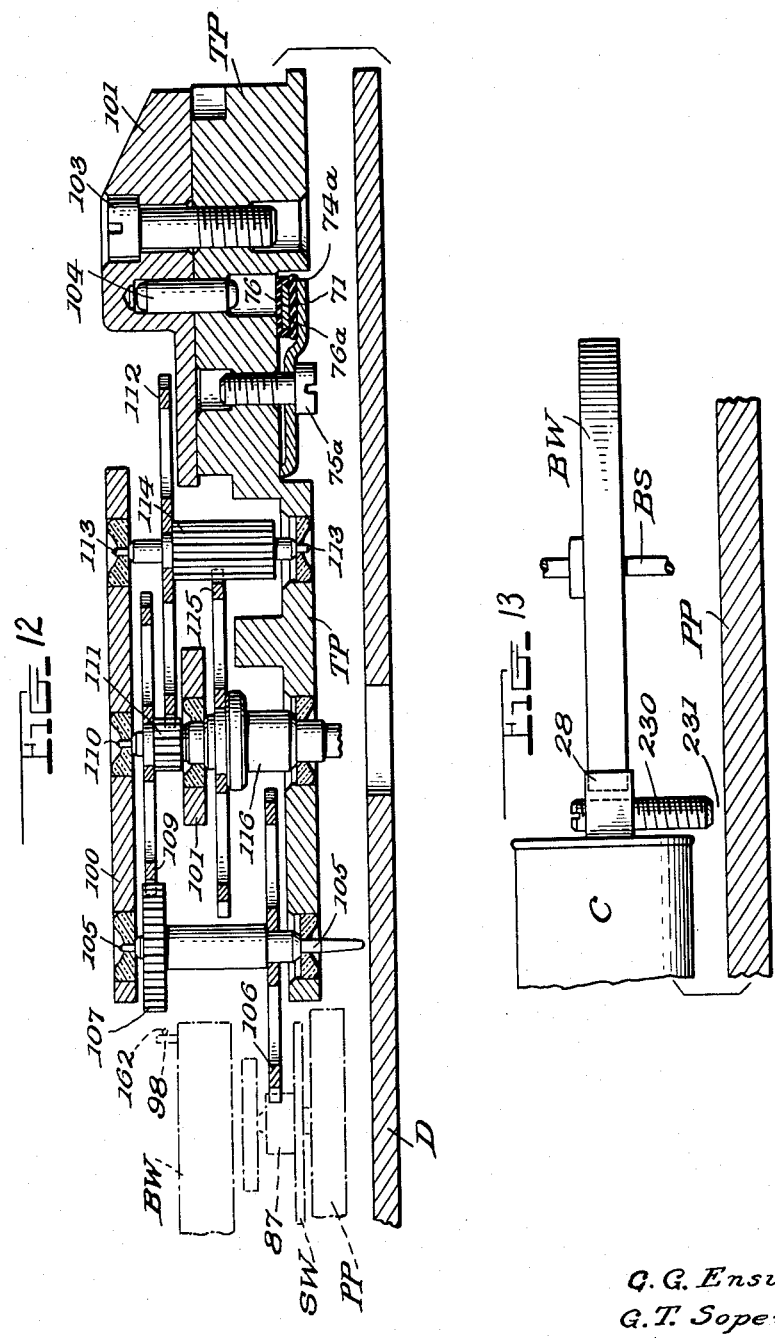

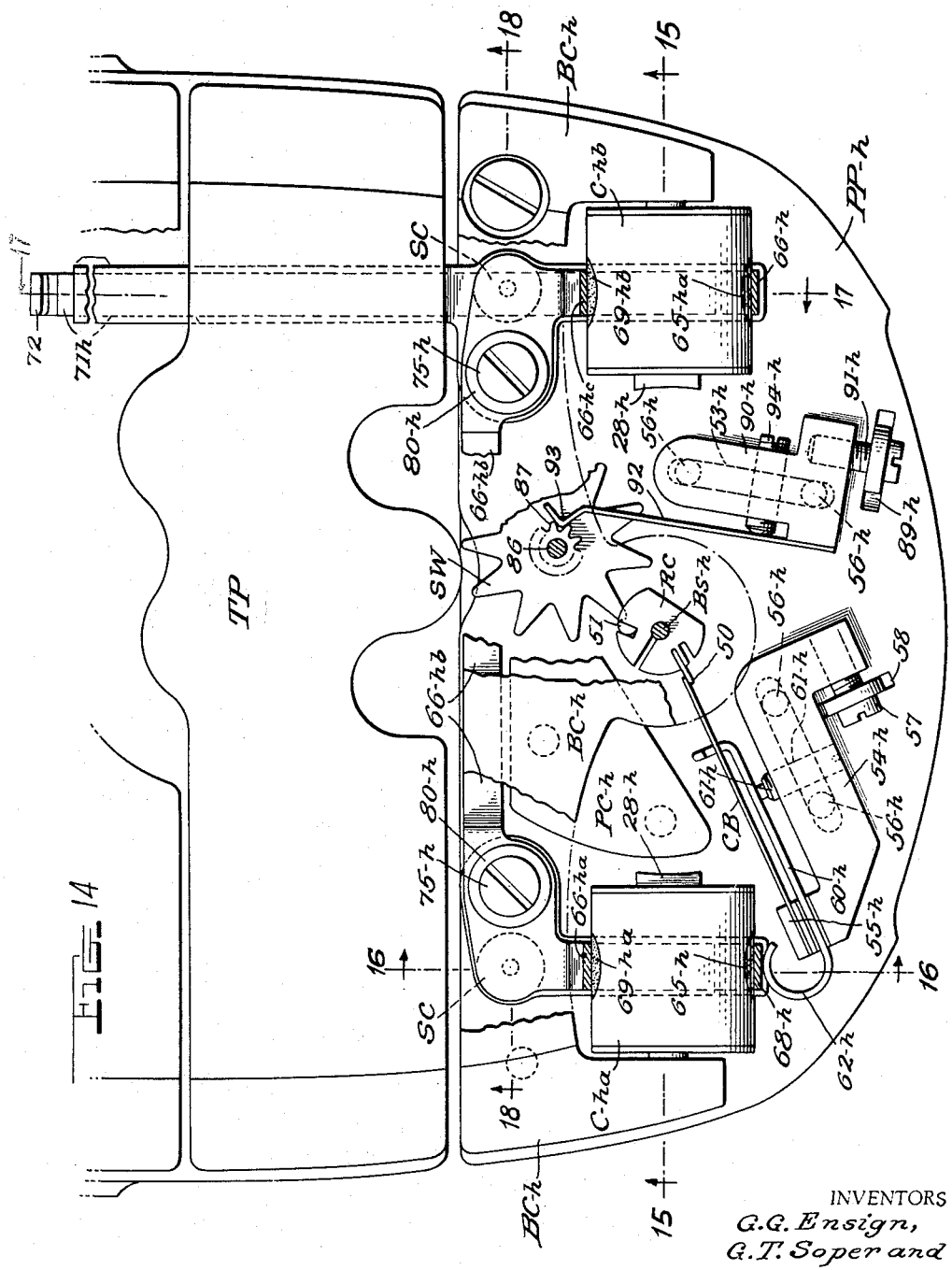

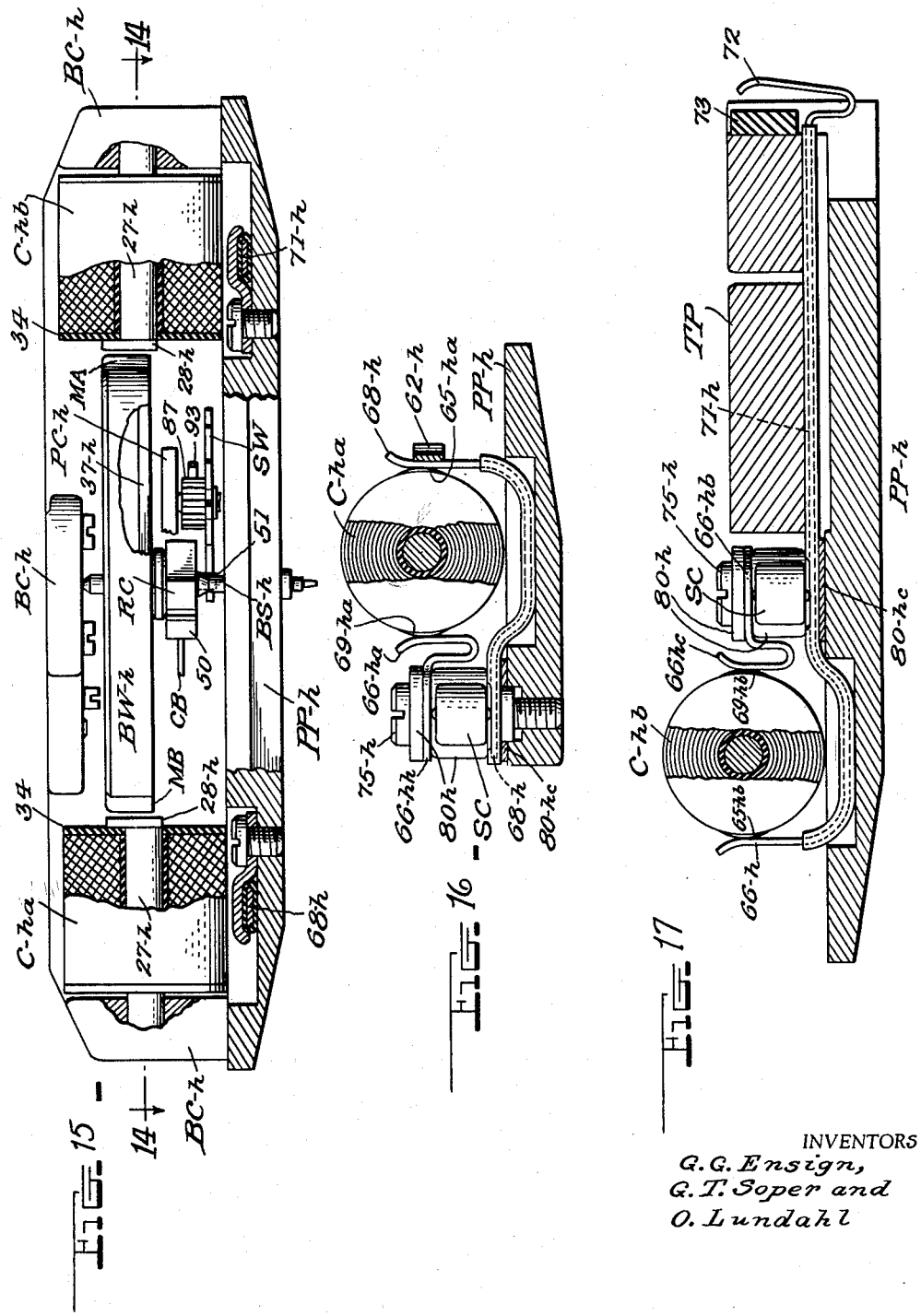

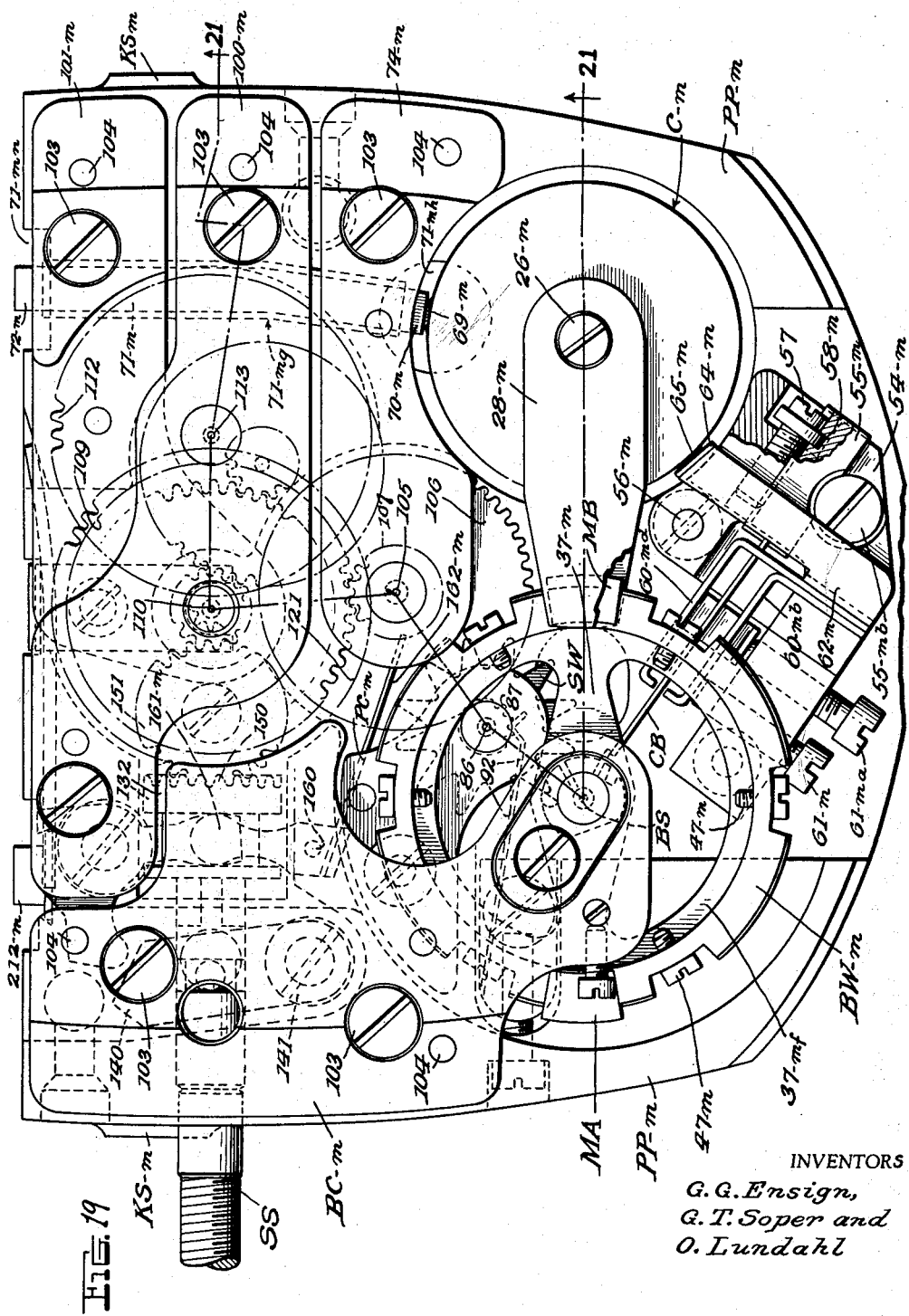

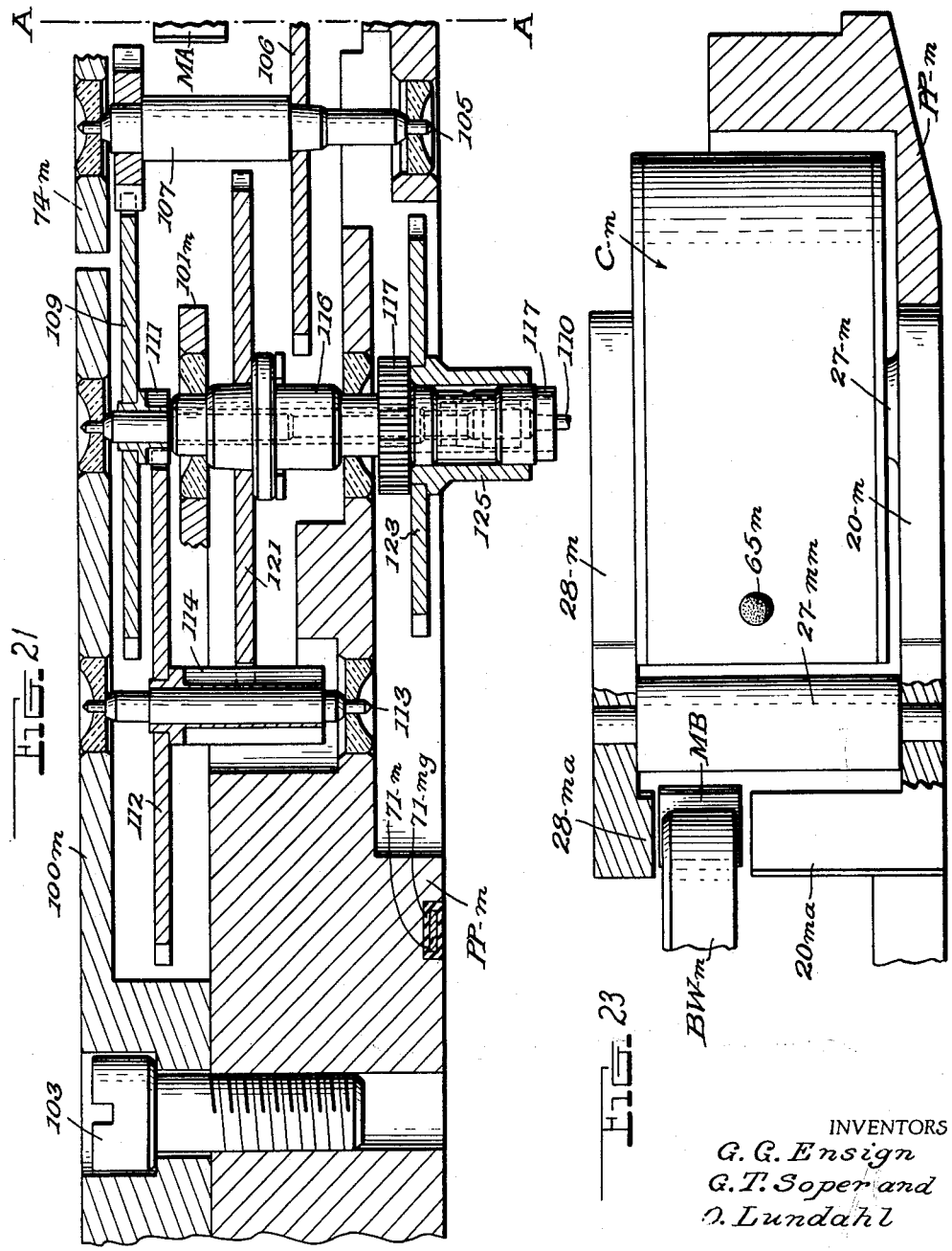

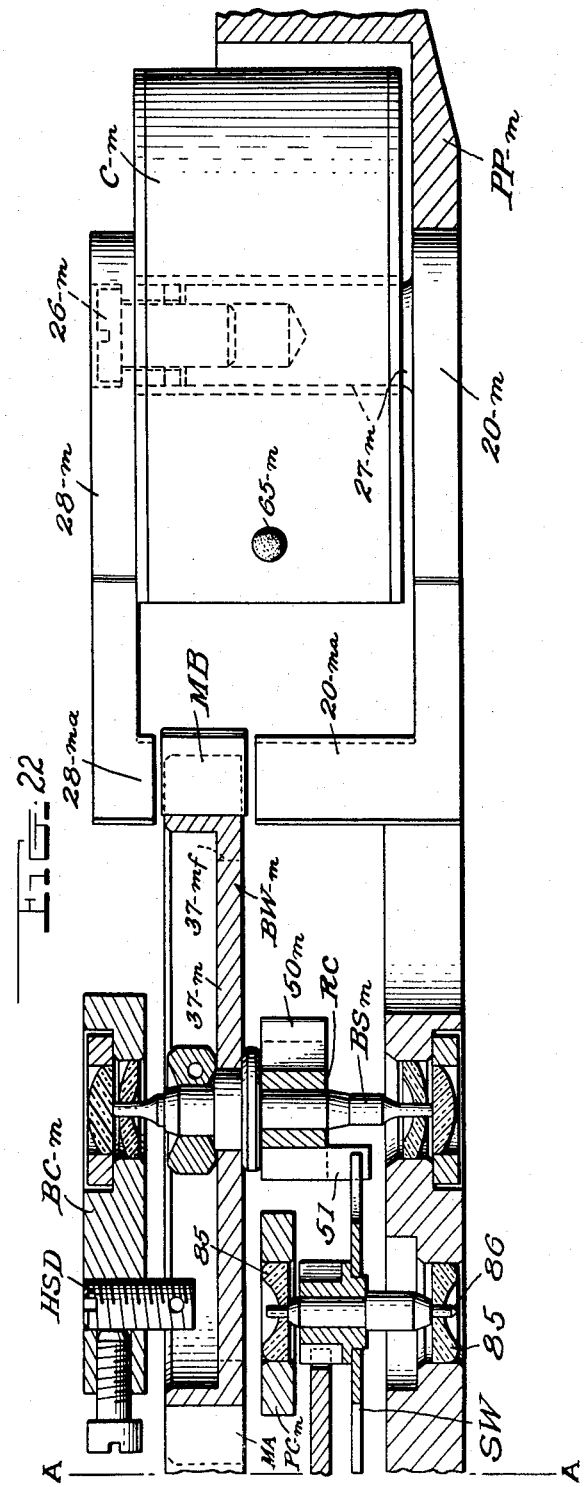

March 2, 1965  G. G. ENSIGN ETAL  3,171,992
ELECTROMAGNET TYPE OSCILLATING MOTOR
Original Filed Aug. 15, 1952  13 Sheets-Sheet 13

INVENTORS
G. G. Ensign,
G. T. Soper and
O. Lundahl

United States Patent Office 3,171,992
Patented Mar. 2, 1965

3,171,992
ELECTROMAGNET TYPE OSCILLATING MOTOR
George G. Ensign, Glenn T. Soper, and Ossian Lundahl, Elgin, Ill., assignors to Elgin National Watch Company, Elgin, Ill., a corporation of Illinois
Original application Aug. 15, 1952, Ser. No. 282,388, now Patent No. 2,865,163, dated Dec. 23, 1958. Divided and this application Dec. 22, 1958, Ser. No. 788,702
14 Claims. (Cl. 310—39)

This invention relates to electrically actuated time measuring devices, and is particularly concerned with such devices preferably of a self-contained nature and which can operate over long periods without replacement or adjustment of parts.

This application is a division of our copending application, Ser. No. 282,388, filed August 15, 1952, now Patent No. 2,865,163, and sets out and claims a system including an electromagnetic motor comprising an oscillatory magnetic balance and magnetic means for impulsing it to maintain it in oscillation.

Many previous proposals and structures have been made in which an electrical battery serves to maintain a balance or like system in oscillation and to operate a time-indicating train. Some commercial structures have been devised for conditions where no limitations of sizes or power requirements are present, for example clocks; while others have had minor restrictions on one or more of the size dimensions, for example automobile clocks, wherewith the current is supplied from the automobile battery and may amount to even several watts; and yet others have been made to operate from a single standard flashlight cell, with the minor restriction of providing space for such a cell and of having mechanical parts which do not so rapidly drain the cell that the time-piece requires cell replacement frequently. As a general rule, the commercially available devices have required electrical power of the order of a milliwatt as a minimum.

When it is sought to provide a wrist watch, the size and weight restrictions for commercial acceptance, with portability and lack of encumbrance equal to that of a spring-driven wrist watch, demand a contained battery and a motive device actuated therefrom which will operate over a period of a year or more, i.e., corresponding to the idle shelf life of many commercial batteries.

A feature of the invention is the provision of a chronometric mechanism of small dimensions with a self-contained oscillator system and electrical means for sustaining oscillation, and a source of power to operate said system for a long period of time.

Another feature is the provision of an electrically powered watch as described above, powered by an electrically driven motor as an integral part of the mechanism, said motor having an efficiency such that it can be operated for an extended period of time by the energy stored in a battery mounted within the case.

A further feature is the provision of a chronometric mechanism comprising an oscillatory rate-determining member and electricallly actuated means for impulsing the same; said means including a contact blade, a support for said blade connected therewith remote from an end thereof, fixed contact means located to be engaged by the blade between said support and end, and an element carried in oscillation in synchronism with said member for engaging said end of said blade and flexing the same to effect contact engagement.

A further feature is the provision of a chronometric mechanism comprising an oscillatory rate-determining member and electrically actuated means for impulsing the same; said means including a contact blade and a fixed contact for engagement thereby when the blade is flexed, a source of electrical energy and a coil for delivering magnetic impulses to the member, conductor means connecting said source, coil, blade and contact in series, and an element carried in oscillation in synchronism with said member for engaging said blade and during one oscillatory stroke of a cycle flexing the same into and holding the same momentarily in contact with said fixed contact and during the other stroke moving said blade with a non-circuit closing passing action.

A further feature is the provision of an electrically actuated time piece including an oscillatory rate-determining member, an element carried in oscillation in synchronism with said member, and a contact device actuated by said element, together with means for controlling the position of said device relative to said element whereby to vary the time duration of the current impulse passed by said contact device.

A further feature is the provision of a chronometric mechanism comprising an oscillatory power member, electrical means for magnetically impulsing said member, and means for controlling the energy transferred to said member during a magnetic impulse.

A further feature is the provision of a miniature electrically actuated oscillatory motor of such size and efficiency that it may with its power source and a time indicating mechanism be completely enclosed within a conventionally sized watch case.

A further feature is the provision of an electrically actuated chronometric mechanism, including a retarding or braking device for restricting false movement of an indicator driven therefrom.

A further feature is the provision of an electrically actuated chronometric mechanism including an oscillatory member, an inductance coil for magnetically impulsing the member, electrical contact means controlled from said member for effecting energization of the coil, and means for effecting dissipation upon breaking of the contact means of the energy stored by said coil.

With these and other features as objects in view, as will appear in the course of the following description and claims, illustrative practices in accordance with this invention are shown in the accompanying drawings, in which:

FIG. 1 is a plan view of a motor unit, seen from the balance cock side.

FIGURE 2 is a sectional view substantially on line 2—2 of FIG. 1, on a somewhat larger scale.

FIG. 3 is a sectional view, with the balance cock, regulator, hairspring and hairspring collet removed, substantially on broken line 3—3 of FIG. 2.

FIG. 4 is a sectional view substantially on broken lines 4—4 of FIGS. 2 and 5.

FIG. 5 is a sectional view showing contact parts, substantially on line 5—5 of FIGS. 1 and 4.

FIG. 6 is an end view of the contact block, taken substantially on lines 6—6 of FIGS. 1 and 4.

FIG. 7 is a sectional view substantially on lines 7—7 of FIGS. 1 and 4, showing a conductor strip and rectifier assembly.

Figure 24:
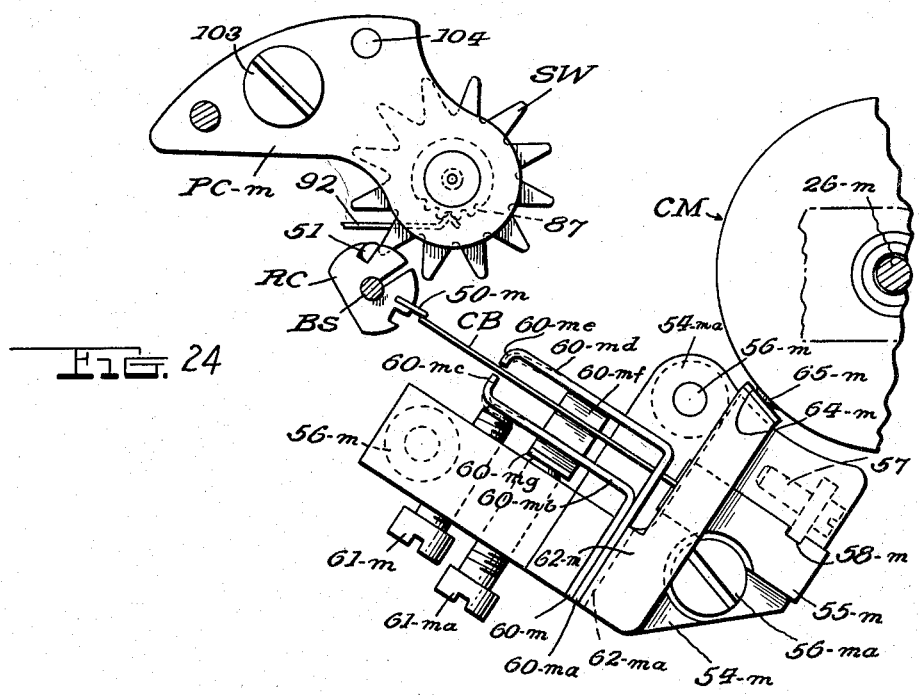

FIG. 8 is a sectional view substantially on lines 8—8 of FIGS. 1 and 4, showing the location of a conductor clamp.

FIG. 9 is a perspective view of the electrical coil and its core and pole piece assembly.

FIG. 10 is a perspective view showing the structures and parts of the electrical circuit.

FIG. 11 is a perspective view of the base plate of the stator structure.

FIG. 12 is a section showing parts of the train.

FIG. 13 is a view corresponding to a fragment of FIG. 2, but showing an adjustable motion control device included in the structure.

FIG. 14 shows another form of structure, in a sectional view substantially on line 14—14 of FIG. 15, with the balance cock and balance wheel omitted.

FIG. 15 is a sectional view substantially on line 15—15 of FIG. 14, in general along the diametrical plane of the balance staff.

FIG. 16 is a sectional view substantially on line 16—16 of FIG. 14, showing the connections at one of the electrical coils.

FIG. 17 is a sectional view substantially on line 17—17 of FIG. 14, showing the electrical connections at the other coil.

FIG. 18 is a sectional view substantially on line 18—18 of FIG. 14.

FIG. 19 is a view corresponding to FIG. 1, showing a further form of structure.

FIG. 20 corresponds to parts of FIG. 19, and shows a modified construction thereof in which a permanent magnet is provided as a stator shunt.

FIGS. 21 and 22 jointly show, on a larger scale, an unfolded sectional view substantially on broken lines 21—21 of FIG. 19, the figures abutting at line A—A.

FIG. 23 corresponds to a part of FIG. 22, showing the modified construction of FIG. 20.

FIG. 24 is a view of parts in FIG. 19 substantially parallel to the pillar plate and showing contact and power take-off structures.

The invention has been shown illustratively employed with watch parts, certain structures or parts normal to conventional watches being omitted for simplicity.

In the form of construction shown in FIGS. 1–13, the structure illustratively has a pillar plate PP, a train plate TP, a balance cock BC, a balance staff BS, a balance wheel BW, a hairspring HS with an overcoil HSC, a dial D, mounting lugs or shoulders KS, KS–b, a battery B with terminals 210, 211 for cooperating with the contact clips 72, 212 on the plate TP, and with projections 180, 181 on the base plate PP of the power unit, these projections overlapping parts of the train unit base TP so that the parts may be rigidly assembled by screws.

CASE AND MOUNTING OF PRE-ASSEMBLED PARTS

In the form of case and mounting illustrated in FIGS. 1 to 4, the watch case has a front ring KF integral with the wall KW which surrounds the movement structures and battery and has the attachment lugs KA for supporting the pin bars KP for receiving the watch strap. The front ring KF has the usual groove for the crystal CY. The rear of the case is closed by the case back KB which is frictionally fitted into a rebate provided at the rear of the case wall KW. The case wall KW is notched for the passage of the part SA of the setting stem SS having the crown CR.

Within the cavity provided by the case members are seated the dial D which bears against the inner face of the front ring KF; a motor and take-off sub-assembly including a power unit base plate PP; a train sub-assembly mounted on a train unit base plate TP; and an electric battery B, these parts being assembled in a mounting ring MR from the dial side thereof, and this assembly then inserted through the rear of the case, in the absence of the case back KB. In FIGS. 2 and 3, the structure is shown as having the sweep-seconds, minutes and hours hands S, M and H, mounted as usual between the dial D and the crystal CY. In the illustrated construction, the motor and train sub-assemblies are connected together as a unit, before introduction into the mounting ring MR, as described hereinafter.

The power base plate PP has case shoulders KS, and the train base plate TP has case shoulders KS–a. The battery B has case shoulders KC–b and KS–c. These case shoulders are engaged by the mounting ring MR which is slipped inside of the case wall KW and, being itself held by the case back KB, serves to hold the parts, including the dial, tightly against the front ring KF.

The illustrated power unit base plate PP has two projections 180, 181 which overlap parts of the train unit base plate TP, so that the parts may be assembled in rigid relative position, prior to encasing, by the screws 184, 185. FIG. 4 shows the assembly at the projection 180, and that at the projection 181 is the same save for the relative size of parts. The terminals 210, 211 of the battery B are on a wall parallel to the staff axes, and co-operate with the contact clips 72, 212 carried on the plate TP.

MOTOR SUB-ASSEMBLY

The base plate PP of the motor sub-assembly is illustratively made of magnetizable material of low permanent magnetism, i.e. remanence. As shown in FIGS. 5 and 6, the base plate PP has upwardly extending portions 20, 24. On the projection 24 is fixedly mounted a block 25 (FIG. 44) which is held in position by screws 26 passing through holes of block 25 which are larger than the screw stems. Block 25 supports a core piece 27 at whose free end is a stator block 28 providing a pole face between the peripherally spaced edges 29, 30 thereof. In the example of execution the pole face 28 has an arcuate angle, relative to the balance system axis, of 16 degrees. In the illustrated form, the block 25, core 27, and stator block 28 are formed integrally of magnetizable material of low permanent magnetism.

A coil C is wound on the core 27 between the end washers 34.

A balance cock BC is secured (FIGS. 5 and 6) to the face of the projection 20 and carries the bearing 35 for one end of the balance staff BS, which is supported at its other end by a bearing 36 in the base plate PP.

The balance staff BS supports the diametrical cross-arm 37 of the balance wheel having the rim BW made of magnetizable material of low permanent magnetism. This balance wheel rim BW has notches 40, 41, 42, 43, 44, 45; the notch 40 being shown adjacent the stator pole face 28, an illustrative position. The notches have the same peripheral dimension, which is greater in this form than the distance between the pole face edges 29, 30. The balance wheel notches receive the heads of the rating or poising screws 48 so that the heads thereof do not extend beyond the general rim periphery, whereby the mechanical clearance, i.e. the magnetic air gap, between the stator pole face 28 and the balance rim BW may be made very small. The notches 40 . . . 45 in the illustrative form each have an arcuate angle, relative to the balance system axis, of 24 degrees. The pole face 28 and notch 40 are so oriented, at the beginning of electrical impulse in the clockwise balance stroke, that the edge 29 is spaced about 2 arcuate degrees from the adjacent edge 40a of the notch 40.

The balance staff BS supports the hairspring collet HC to which is fixed the inner end of the spiral hairspring HS, which, at its outer end, is pinned in the hairspring stud HD. A regulator lever RL may be positioned on the dome BCD of the balance cock BC and have the regulator pins RP for engaging the hairspring at positions of adjustment near the hairspring stud HD. The hairspring HS is shown as a spiral having a so-called overcoil HSC displaced out of the main plane of the spiral in the usual fashion, wherewith the regulator pins RP (FIG. 13) terminate short of the plane of the main part of the hairspring HS.

The balance staff BS receives a collet RC (FIGS. 6 and 8) having a radially projecting fin 50 for actuating the electric contact system, and made of sapphire or like abrasion-resistant material. The collet RC also carries the axially projecting jewel pin or roller 51 for moving the power take-off star wheel SW as described hereinafter.

The base plate PP has a groove 53 (FIGS. 8, 9 and 10) along which may guidedly move the downwardly extending key 53a of a block 54 having a projection 55 supporting one end of the electrical contact blade CB. A screw 56 passing through the slot 57 of block 54 engages in the base plate PP for binding the block 54, 55 in its adjusted position. The movement of the block 54, 55 relatively toward and from the balance staff BS is produced by a screw 59 engaged in the block 54 and having an enlarged head engaged in a notch 58 in the base plate PP.

This movement of the block 54, 55 moves the contact blade CB essentially radially with respect to the axis of the balance staff BS, and controls the arc of overlap of the contact blade CB with the actuating fin 50 while these are in engagement. When this overlap is shortened, the time of engagement is less, and therewith the time of electrical conduction between the contact blade CB and its stationary contact 60; the length of the electrical impulse is shortened, and therewith the amount of energy delivered for magnetically impulsing the balance system. By increasing the overlap, the duration of the contact engagement is increased, and greater energy is supplied at each impulse.

The projection 55 also has a notch in which is insulatedly mounted the fixed contact blade 60 having one end bent angularly for engagement by the movable contact blade CB. The relative position of this end can be adjusted by the screw 61 (FIGS. 8, 9 and 10) mounted in the block 54. The blade 60 is illustrated as formed integrally with an extension portion 62 which bears against the terminal 65 on the coil C.

The other terminal 69 of the coil C is engaged by a conductive yoke 66 which extends arcuately over the coil C to a point opposite the terminal 65 (FIG. 12) and mechanically engages and holds the rectifier SC against the extension 62 so that this rectifier is electrically in shunt to the coil C. It will be noted that the yoke 66 imposes no lateral displacing force upon the coil. A spring clip 70 is formed as an upstanding end of a conductor strip 71 which extends across the train base plate TP and has a spring contact end 72 for engaging one terminal of the battery B, as described hereinafter. A clamping block 74 is held to the base plate PP by a screw 75 and presses a piece of insulation 76 against the conductor strip 71, and this in turn against the insulating block 68 which preferably is cemented onto the base plate PP.

Except for the contact clip ends 70, 72 and the portion engaged with the rectifier SC, the conductor strip 71 is insulated electrically, preferably by the coating 66 applied with thermo-adhesion heating before assembly, from the train base plate TP, along a groove of which (FIGS. 12 and 22) it passes and to which it is clamped by block 74a and screw 75a. An insulating block 73 prevents contact of the end contact clip 72 with the train base plate TP if the battery is forced too far toward the train sub-assembly.

The base plate PP supports a star wheel cock PC, held in place by a screw 83 and steady pins 84. This star wheel cock PC (FIGS. 6, 7 and 13) has a bearing 85 which cooperates with bearing 85 in the base plate PP to support the star wheel pinion 87 having the pivots 86 and supporting the star wheel SW, which in the illustrative form has ten teeth which successively come into the path of movement of the axially extending jewel pin 51 on the collet RC. In the illustrated form, the shapes and sizes of the teeth in pinion 87 and in the transfer wheel 106 meshing therewith provide a permissive back lash of 7 degrees in the pinion 87. A block 90 is mounted in a groove 89 (FIGS. 8 and 14) on the base plate PP by a screw 91 passing through a slot 93 in the block, and supports a locating spring 92 having a bent free end, with a bight 93 positioned for engagement in the gaps between adjacent teeth of the pinion 87, and effective for acting against these teeth for positioning the successive star wheel points in a predetermined angular position relative to the line between the axes of staff BS and pinion 87, while the star wheel is momentarily at rest. By loosening the screw 91, and moving the block 90 along the groove 89, the position of the end of the locating spring 92 may be shifted, and therewith the angular positions occupied by the pinion 87 and the star wheel SW while at rest, thus controlling the position of the star wheel points, illustratively SF-a, at the instants of engagement by the jewel pin 51.

The balance system oscillates in the usual fashion. It receives an impulse magnetically at each cycle of oscillation. Therewith, the roller collet RC moves its jewel pin 51 in a path which intersects the points of the star wheel SW (FIG. 4), and thus the train is driven.

Simultaneously with the power take-off by the action of jewel pin 51 upon the respective star wheel point, the fin 50 is causing closure of electrical contact by the blade CB, and therewith impulsing is occurring: so that a part of the electromagnetically induced force or impulse upon the balance is being immediately employed for the train drive, and the balance is in effect a coupling member for transmission of the train-driving power from the motor stator to the star wheel without storage of this power in the balance. Further, the contact fin 50 acts through an arc of 12 to 15 degrees, in a permissible adjustment of the blade CB, and this is distributed about equally at each side of neutral axis so that little effect is produced for changing the balance system from its natural rate.

MODIFIED MOUNT FOR LOCATING SPRING

The modified structure of FIG. 16 shows another manner of supporting and adjusting the locating spring 92, in which the locating spring 92 is supported by a block 90a having a slot 93 for the locking screw 91. A screw 91a is threaded into the block 90a and has its axis substantially parallel to the base plate PP and to the spring 92, with its collar 91b engaged in a notch 89b of the base plate, wherewith the screw 91a can be rotated for moving the block 90a toward and from the axis of the star wheel, for adjusting the angular position of the star wheel points. This form of construction also includes a screw 91c engaged in the block 90a, and bearing against the locating spring 92, wherewith adjustment may be made of the spring tension being exerted against the faces of the teeth of the pinion 87.

ELECTRICAL CIRCUIT

The parts of the electrical circuit are shown in perspective in FIG. 10. The battery B has its terminal 210 presented in electrical contact with the spring clip 72 on the conductor strip 71 which passes (FIG. 7) along a groove in the train base plate TP and has the clip end 70 adjacent a terminal 69 of the electrical coil C. The other terminal 65 of the electrical coil electrically contacts the extension 62 of the side contact 60 which is mounted in the block 54, 55. The yoke 66 (FIGS. 2 and 10) fits closely around the coil C at parts adjacent the terminal 69 for secure electrical connection with the terminal 69; and arches over the coil and engages the rectifier SC at the outer conductive face thereof for pressing the inner conductive face against the extension 62 and holding the latter against the terminal 65 both mechanically and electrically. The clip end 70 resiliently engages the yoke 66 essentially in line with the terminal 69 for secure electrical connection of these several parts.

The other terminal 211 of the electrical battery B is in electrical contact with a clip 212 (FIG. 10) carried by and grounded to the train base plate TP, and thus in electrical conductive relation with all non-insulated parts of the structure, including the block 54, 55 and the contact blade CB, as indicated by the grounds in FIG. 10.

When the contact blade CB is away from the stationary contact 60, essentially no current flows through the system from the battery.

When the contact fin 50 in its clockwise stroke (FIG. 4) engages the contact blade CB and moves it into engagement with the end of the stationary contact 60, a circuit is closed, which may be traced from the battery B by terminal 210, clip 72, conductor strip 71, clip 70, yoke 66, terminal 69, through the electrical coil C to the terminal 65, thence by extension 62 to the stationary contact 60, contact blade CB, block 54, 55, to the frame as a common ground, with return by the clip 212 to the terminal 211 of the battery B. This current flow is in the same direction as that which has been imposing a static potential on the rectifier SC, and hence this rectifier conducts no more current than before. This current energizes the coil C, and an impulse is delivered to the rim BW of the balance system.

Shortly after this making of the circuit, e.g. a few milli-seconds, the contact fin 50 in its clockwise movement (FIG. 8) frees the contact blade CB, so that the circuit is again interrupted between the blade CB and the stationary contact 60. At this time, the coil C has maximum magnetic effect, and its induction tends to cause the current to continue to flow in the same direction as the stated impulsing current, that is, from the terminal 69 to the terminal 65. This would normally cause a sparking between the contact blade CB and the stationary contact 60 at the moment of breaking: but in the described system, the current derived from the collapsing magnetic field can flow through the strip 66 and the rectifier SC, so that the coil is essentially short circuited and rapidly loses its induced voltage: it being noted that the counter-electromotive force across the rectifier SC which is present while current is flowing from the battery, is no longer present to inhibit this discharging flow from the coil C in the "passing" direction for the rectifier SC.

MAGNETIC IMPULSING OPERATION

Each time the electrical circuit is made by engagement of contact blade CB with the stationary contact 60, current energizes the electrical coil C and thus magnetizes the base plate PP and the pole piece 28 located in the plane of and closely adjacent the magnetizable balance wheel rim BW. The parts have been shown in FIGS. 3 and 4 with the balance system near the neutral axis, so that the fin 50 has just moved the contact blade CB to engagement with the stationary contact 60 and the current is beginning to flow, it being noted that the balance assembly is now turning in its clockwise stroke as indicated by the arrows in FIGS. 1, 3 and 4. This magnetization of the pole piece induces opposite magnetization in the balance rim BW, so that the stationary pole face 28 attracts the part of the rim between notches 40 and 45, with a magnetic air gap existing between the parts closely adjacent the edges 29 and 40a: these forces acting to add to the kinetic energy of the balance system whereby to maintain it in motion against frictional losses and the like, and also providing at this instant the energy for beginning the movement of the star wheel SW. This occurs at the neutral axis, when the balance is moving at maximum velocity: and the impulse effect is essentially symmetrical relative to the neutral axis, so that rate disturbance is minimized. Shortly thereafter, at a time determined by the adjustment of the block 54, 55 and the overlap of the contact blade CB with the fin 50, the contact blade CB is released and leaves the stationary contact 60. The field in the electrical coil C collapses by discharge of induced current through the rectifier SC, so that by the time that the part of the rim BW has come opposite the pole face 28, the magnetic energization has been dissipated, and there is thereafter essentially no magnetic drag upon the free further oscillatory movement of the balance system.

In this illustrative form, the magnetizable material of the balance rim is opposite the power base plate PP, likewise of magnetizable material, and the flux path is closed by so-called leakage effects therebetween; it being noted that large areas are presented for the purpose so that the local magnetic density in such air gap is low and that the areas of the respective parts are essentially constant during the period of energization. In this illustrative form, the low remanence of the materials used is effective, in conjunction with the rapid dissipation of the magnetic field due to the action of the rectifier SC, essentially to eliminate magnetic couplings except during the energization period.

In the form illustrated in FIGS. 1, 4, 5, 6 and 10 the electrical circuit is only closed during one stroke of each cycle, being the clockwise stroke in FIG. 3: because the fin 50 moves the contact blade CB away from the stationary contact 60 during the return or counterclockwise stroke.

CONNECTION OF MOTOR AND TRAIN SUB-ASSEMBLIES

As shown in FIG. 1, the power unit base plate PP has two extensions 180, 181 which overlap corresponding parts of the train unit base plate TP. Screws 184, 185 pass through the parts for connecting them fixedly together, so that the two sub-assemblies can be united to a single unit, and this unit connected to the dial D before insertion in the watch case. This mechanical and electrical connection holds the plates fixedly together and at the same electrical potential, that is, that of battery terminal 211, noting FIG. 10.

The power unit and the train unit can be separately manufactured, preferably with the conductor strip 71 held clamped to the train base plate TP by the clamp block 74a (FIG. 12) and its screw 75a, with the insulating pad 76a and with its ends 70, 72 projecting beyond the plate TP. During the mechanical assembly of the units, the strip 71 comes to lie upon the block 68 on the power base plate PP (FIG. 7), and the end clip 70 bears against the yoke 66. When the screws 184, 185 have been tightened, the strip 71 can also be secured in place on plate PP by bringing the block 74 (FIG. 7) into place and clamping it by the screw 75. The strip 71 is thus protected by train structures while the units are separated.

CONTROL OF MOTION OF BALANCE SYSTEM

It has been found desirable to provide means for controlling the amplitude of motion of the balance system.

In horological mechanisms having a pallet or the equivalent, the rate of the movement depends somewhat upon the arc traversed by any part of the balance during its oscillation. In particular, the length of the arc has an influence upon position error. It is customary to have a spring-driven watch, for example, oscillate in an arc of about one and five-eighths turns (585°) from standstill to standstill, when the mainspring is fully wound: with this arc decreasing during unwinding until the oscillation is about one and an eighth turn (405°) at the time when the spring barrel and mainspring have unwound for 24 hours or more. In such horological mechanisms, the energy input at impulsing can be adjusted to control the amplitude in various ways such as changing the mainspring, changing the adjustment of the escapement, etc. Motions in excess of one and five-eighths turns, e.g. as produced by shaking or twisting the case, are not necessarily harmful with a pallet, because the pallet fork has been moved by the roller pin at neutral axis and is held in its moved position by the escape wheel; and hence even if the roller pin performs a further arc of nearly 360° (total arc of nearly two turns), the roller pin may merely engage and rebound from the back of the pallet fork, and thus does not displace the pallet so that the fork will not properly receive the roller pin during the return stroke: and this excess of arc beyond the normal is rapidly consumed by friction because the energy of each impulse will be no greater than before.

With an electromagnetically actuated balance system, the frictional effects in the balance and train will vary from unit to unit, and there may likewise be variation in the batteries, both when new and during their effective lives. Thus, it is desirable to control the energy content of each impulse, and to prevent excessive amplitude of oscillation: noting especially that if an electrically-driven system swings for two turns (i.e. 360° past neutral axis), a second impulse is delivered.

One control of the energy content per impulse is that of adjusting the length of electrical contact through movement of the block 54, 55 as described above.

Another manner of controlling the motion in a given assembly of mechanism and battery is illustrated in FIG. 13, in which the pole piece 28 has a threaded aperture for receiving a screw 230 of magnetic material of low remanence. By rotating this screw, its end may be brought closer to or farther from the base plate PP of magnetizable material, thus varying the magnetic air gap at point 231, forming an adjustable magnetic shunt across the normal magnetic flux path through the balance wheel, and thus regulating the energy content of the successive impulses.

ELECTRIC COIL

A coil construction for the motor drive in FIGS. 1–10 is shown in perspective in FIG. 9. Such a coil may be fabricated by preparing the core 27 with its end piece 25 of magnetizable material of low remanence: the structure may be formed integrally by machining a block of material, by pressing resin-iron powders in a mold, or from joined parts. The other end of the core 27 has an axial hole 27a. End washers 34 are positioned, and the pole face piece 28 with its stem 28a is engaged, and the stem tightly force-fitted into the hole 27a. It is then preferred to heat treat the material for optimum permeance, and then employ an insulating lacquer to coat the surfaces and fix the washers 34. The coil is wound with insulated wire CW in the usual way. It may then be saturated with an insulating compound. The ends of the winding are left projecting outwardly, with the outer end 265 near the center of length thereof, in the illustrated form. The inner end 266 of the winding is brought out adjacent one of the end washers 34. These wire ends are pressed down upon the outer surface, and then drops of an electrically conductive lacquer or cementing composition are applied thereover to secure the wire ends tightly to the structure in positions for engagement by the clips 65, 70, both mechanically and electrically by reason of the adhesion and conductiveness if such a mixture when set, thereby forming the terminals 65, 69 on the coil. (FIGS. 7 and 9).

Another form of construction according to this invention is shown in FIGS. 14–18. The differences in this form from that shown in FIGS. 1–13 are that the pillar or base plates are positioned adjacent the dial, a diametrically opposed pair of coils is provided, and variations in detail are given in other parts.

The base plate PP–h supports a balance cock BC–h which has a bearing for supporting one end of the balance staff BS–h, as before. Either the balance wheel rim BW–h and its cross-arm 37–h, or both, may be formed of magnetizable material of low remanence, and the other of non-magnetizable material such as brass. Two blocks MA and MB of magnetizable material of low permanent magnetism or remanence are fixedly mounted on the rim, being located at the ends of the diametrical arm 37–h in the illustrated form, and projecting beyond the periphery of other parts of the balance rim BW–h. The balance staff BS–h supports the roller collet RC which has a fin 50 and a jewel pin 51.

The balance cock BC–h is formed of magnetizable material of low permanent magnetism, and provides a magnetic yoke connecting the cores 27–h of the electrical coils C–ha, C–hb, being provided with single pole faces 28–h which are diametrically opposite one another across the axis of the balance system.

The contact system (FIG. 14) for this form of practice includes the contact blade CB which is mounted on an arm 55–h of a sliding block 54–h movable along the base plate PP–h relative to the axis of the balance system, the movement being effected by rotation of the screw 57 which has a collar engaged in a notch 58 in the base plate, as before. The stationary contact 60–h in this form of construction is insulatedly carried in the block 55–h as before, but has its contact end positioned at the side of the contact blade CB opposite the block 54–h: and the other end of the contact member is provided by a curl 62–h engaging the end of conductor strip 68–h, which in turn engages the contact 65–h of the electrical coil C–ha. The screw 61–h passes through the block 54–h and can be rotated for adjustment of the position of the stationary contact 60–h relative to the contact blade CB.

A star wheel cock PC–h (FIG. 14) is mounted on the base plate PP–h and supports one end pivot 85 of the star wheel pinion 87 on which is mounted the star wheel SW, the pinion and star wheel each having ten teeth as before. The locating spring 92 has the part 93 engaged in the gaps between pinion teeth and is mounted on a block 90–h which can be moved on the base plate PP–h relatively toward and from the axis of the star wheel by a screw 91–h having a collar engaged in a groove 89–h of the base plate. In this form, the locating spring may likewise be adjusted for controlling the action upon the star wheel.

In FIG. 14, the adjustable sliding blocks 54–h, 90–h are shown as held in adjusted position each by a pair of screws 56–h.

The circuit connections from the battery to the coils are obtained in this form of construction by engaging one contact clip 72 with one terminal of the battery as before, this clip being connected with the conductor strip 71–h which passes along a groove in the train base plate TP–h as before, and which presents its end 66–h as a clip for engagement with the terminal 65–hb of the coil C–hb. A conductor strip 68–h has its end presented for engagement with the terminal 65–ha of the coil C–ha and is provided with insulation over other parts of its structure, being electrically contacted by the end 64–h of the stationary contact 62–h. A tie bar 66–hb has contact clips 66–ha, 66–hc at its ends (FIG. 14) respectively engaged with the terminals 69–ha (FIG. 16) and 69–hb (FIG. 17) of the coils C–ha and C–hb respectively. Except for intended contact areas, the strips are coated with insulation. These conductors parts are held in position and assembled with rectifier units adjacent and in shunt to each coil by the screws 75–h which pass through apertures of the link 66–hb, being insulated therefrom by spacers 80–h, through apertures in the respective conductor members 66–h and 68–h, then through the insulating washers 80–hc, and into the base plate PP–h. Between the ends of the link 66–hb, and the respective underlying conductors 66–h and 68–h, there are located a pair of small rectifier units SC in electrical contact therewith, thus being individually in shunt across the respective coils C–*ha* and C–*hb*. These are connected to their coils in the fashion and arranged to operate in the manner above described with respect to the rectifier and coil in the circuit of FIG. 16.

Thus the circuit connections are established from the battery by contact clip 72, conductor strip 71–*h* and its end 66–*h* to the terminal 65–*hb* of the coil C–*hb*, thence by the other terminal of this coil to the contact clip 66–*hc* and by the link 66–*hb* to the other contact clip 66–*ha* and thus to a terminal 69–*ha* of the coil C–*ha*, leaving this coil by terminal 65–*ha* and the contact clip 68–*h* and passing through the stationary contact element 62–*h*, 60–*h*, with the return completed, when the contact is closed by the balance system, by engagement of this stationary contact 60–*h* with the contact blade CB, and thus to the block 55–*h* and through the frame to the ground clip 212 secured to the train plate TP–*h* as before, and in contact with the other terminal of the battery B.

In the further form of construction shown in FIGS. 19–24, the power unit and the train structures are mounted on a single pillar or base plate, and the power unit is given two electrical impulses per cycle of oscillation, these impulses being delivered to an electrical coil which is mounted with its core parallel to the balance staff.

The pillar or base plate PP–*m* is shaped and recessed as before to provide supports for the various staffs and other parts. The base plate PP–*m* has case shoulder pojections KS–*m* which are engaged by the mounting structures and thereby the parts are maintained in a position wherein the dial rests as before against the inner surface of the front ring. The base plate extends past the center of the dial, to provide support for the staffs connected to the hands S, M, H: but terminates along a chordal line spaced from the end closing wall of the watch case, so that the battery B can be fitted in this space and thereby have a thickness from front to back closely approximating the distance from the dial to the internal surface of the case back KB.

PLATE AND BRIDGE ASSEMBLY

The base plate PP–*m* has bearings therein and supports bridges 74–*m*, 100–*m*, 101–*m*, and a cock PC–*m* containing other bearings whereby to support star wheel pivots 86, pivots 105 for the pinion 107, pivots 113 for the pinion 114 which supports the seconds: minutes sleeve 116 for the seconds and minutes hands S, M, and the hub 125 for the hours hand H. The balance cock BC–*m* supports a bearing for the balance staff BS–*m* and carries the hairspring stud HSD with its clamping screw. The center train bridge 100–*m* carries a bearing for the sweep-seconds pinion 111; and also a bearing for the pinion 114 which supports the seconds:minutes reduction wheel 112. The train bridge 74–*m* carries a bearing for the pinion 107 which supports the wheel 106. The train bridge 101–*m* has a portion interposed between the center train bridge and the pillar plate PP–*m*, and carries a bearing for supporting (FIG. 21) the hollow minutes sleeve 116. A bridge PC–*m* is interposed between the balance cock BC–*m* and the base plate and carries a bearing for supporting the star wheel pinion 87. The several bridges are held by screws 103 and located by steady pins 104.

The balance staff BS–*m* carries the balance wheel BW–*m*, with its arm 37–*m*, the collet HC supporting the inner end of the hairspring HS, and a roller collet RC. The collet RC has projecting axially therefrom the jewel pin 51 which actuates the star wheel SW and thus the train, and also has the contact fin 50–*m* which is of conductive material. By means described in detail hereinafter, electric current is supplied to the contact fin 50–*m*.

A block 54–*m* of insulating material (FIGS. 19 and 24) provides a base for contact structures, and is secured on the base plate PP–*m* by screws 56–*m*. A rear portion 54–*ma* of this insulating base has therein a groove of triangular section for receiving a support block 55–*m* which is of truncated triangular section to fit the triangular groove. The support block 55–*m* has a notch 58–*m* which receives the projecting flange of a screw 57 which is threadedly engaged in the block 54–*m*, for adjusting movement in the directions toward and from the axis of the balance staff BS–*m*. A spring contact blade CB, illustratively a straight flat piece of resilient conductive metal, is fixed in the support block 55–*m* at the end of the contact blade remote from the balance staff, and with the free end of the contact blade projecting free of the block 55–*m* and into the path of oscillatory movement of the contact fin 50–*m*. The insulating block 54–*m* also has a groove transverse to the direction of the contact blade CB, in which groove are received the ends 60–*m*, 60–*ma* of two relatively fixed contact members, and the downturned end 62–*ma* of an electrical conductor strip 62–*m* which lies on the upper surface of the rear portion 54–*ma* of the insulating base, and thus (FIG. 24) is well spaced from the contact blade CB. One edge of the insulating base block 54–*m* is curved (FIG. 24), to conform to the coil or electrical winding C–*m*. The end of the conductive strip 62–*m*, adjacent to the coil C–*m*, is bent angularly and provides a spring contact clip 64–*m* for engagement by the terminal 65–*m* on the coil C–*m*, as will be described in detail hereinafter.

The portion 60–*m* of one relatively fixed contact member is formed integral with a conductive spring portion 60–*mb* extending in general parallelism with the contact blade CB and having its free end 60–*mc* turned towards this contact blade to provide a mechanical stop for the movement of the contact blade and also providing electrical contact connection with this blade during engagement. Correspondingly the contact member portion 60–*ma* of the other relatively fixed contact member is integral with the conductive spring portion 60–*md* which also is in general parallelism with the contact blade CB, but on the opposite side thereof from the blade portion 60–*mb*; the blade portion 60–*md* has its free end 60–*me* bent toward the contact blade CB and likewise serves as a mechanical stop and for electrical contact connection. The blade portion 60–*md* has a yoke 60–*mf*, 60–*mg* connected therewith, the portion 60–*mf* extending beneath both the contact blade CB and the spring portion 60–*mb*, and the part 60–*mg* extending upwardly in general parallelism to but spaced from the blade portion 60–*mb*. It is preferred to form the structures 60–*m*, 60–*mb*, 60–*mc* and 60–*ma*, 60–*md*, 60–*me* from spring sheet metal, with the parts when at rest occupying the positions indicated by dotted lines in FIG. 24.

In assembling the parts, with the contact members occupying the dotted line positions, the spacings or distances of the mechanical and conductive contact ends 60–*mc*, 60–*me* may be adjusted and set by the respective screws 61–*m*, 61–*mn* which pass through threaded holes in the insulating base 54–*m* in directions essentially at right angles to the contact blade CB, and respectively engage the contact members at their portions 60–*mb*, 60–*mg*. In unstressed condition, the blades 60–*mb*, 60–*md* are at an angle of, say 86 degrees relative to the corresponding parts 60–*m*, 60–*ma* as indicated by dotted lines in FIG. 24; so that the screws effect adjustment by the resilient yielding of the parts. In FIG. 24, the screws 61–*m*, 61–*ma* have been shown adjusted so that the contact members have been moved and stressed into the respective positions shown by full lines, wherein the contact blade CB, in unstressed condition, is located centrally between the contact points provided by the ends 60–*mc*, 60–*me*. The material forming the spring portions 60–*mb*, 60–*md* is much thicker in width and section than the material of the contact blade CB. When the contact blade CB is moved at its outer free end until it engages the contact point 60–*mc*, the blade CB yields, but the point 60–*mc* remains essentially in its adjusted position: and correspondingly when the blade encounters the contact point 60–*me*, this point remains in position while the contact blade CB yields.

When the contact fin 50–*m* moves in a clockwise direction (FIG. 24) with the balance staff BS–*m*, it first encounters the contact blade CB while the latter is in its neutral and unstressed condition, and then presses this contact blade CB until it engages the contact 60–*mc*, at which time the circuit is closed; and during this time interval, the contact blade CB has bent as an end-mounted spring member, from its point of engagement in the support block 55–*m*. Thus, the contact blade is not engaged with the contact 60–*mc* until there has been a stressing of the same, and correspondingly there is no rebound when the engagement occurs. As the contact fin 50–*m* continues to move in its clockwise direction, it continues to force the end of the contact blade CB in front of it, thus increasing the stress in the blade and the pressure of its engagement with the contact 60–*mc*; but during this time the contact blade is bending from the mechanical contact point 60–*mc* as a fulcrum, so that its free end is turning through an arc of lesser radius than the exposed length of the total spring CB, wherein the contact fin 50–*m* will escape from the end of the contact blade CB more rapidly than if the spring were bent from its point of mounting.

When the contact fin 50–*m* has stressed the contact blade CB and then passes its end, the electrical circuit is immediately broken at these parts, and the contact blade CB is now free to swing back toward its original neutral position. The kinetic energy in the contact blade, as it approaches the neutral position, will cause it to overswing; even if it should engage the opposite contact 60–*me* at extremely close adjustment of parts, and a long contact arc at the fin 50–*m*, no circuit closure occurs because the contact blade CB is insulated from the pillar plate and other parts, and there is no conduction from the contact fin 50–*m*. During the remainder of the clockwise movement of the contact fin 50–*m* with the balance staff, the contact blade CB comes essentially to rest, its motion being braked in part by the successive engagement with the contacts 60–*mc*, 60–*me* until the major portion of its energy has been consumed, and thereafter by the absorption of the remaining energy by air frictional losses, etc. Thus, by the time that the balance has passed to the end of its clockwise stroke, and then approaches the neutral axis in its following counter-clockwise stroke, the contact blade CB has returned to its neutral position and unstressed condition ready for new engagement, at its opposite face, by the contact fin 50–*m*. Thereupon, the contact blade CB is swung toward contact 60–*me* while stresses are being built up in it, until the engagement occurs with a closure of the electric circuit as before: thereafter, the free end portion of the contact blade CB, between the contact 60–*me* and the contact fin 50–*m* is further bent, this time about the contact 60–*me* as a fulcrum and with the aforesaid mechanical behavior, until the contact fin 50–*m* releases the contact blade CB, with an opening of the circuit as before.

The arcuate length of the engagement, measured from axis of the balance staff BS, from contact fin 50–*m* to the contact blade CB is determined by the relative overlap of these two parts when they are essentially at the neutral axis: and this in turn can be adjusted by moving the support block 55–*m* toward and from the axis of the balance system, by rotating the adjustment screw 57. When the parts are at proper position, the screw 56–*ma* is tightened, so that its head binds the block 55–*m* in position.

The star wheel pinion 87 has fixed thereon a star wheel SW, FIG. 24, here illustrated with twelve points, and the pinion 87 (FIG. 21) likewise has twelve teeth. Proper selection of ratios are made for wheels and pinions 106–107–109 so that the center seconds pinion 111 will turn at one revolution per minute. The points of the star wheel are successively contacted by the jewel pin 51 which partakes in the oscillatory movement of the balance assembly, as before. A locating spring 92 can be employed.

The pillar plate has a groove 71–*mg* along the front or dial-adjacent face thereof leading from a notch 71–*mn* in the chordal edge, to a hole 71–*mh* located opposite the peripheral surface of the electrical coil C. During manufacture, the groove 71–*mg* is provided with an insulating coating and with a conductor strip 71–*m*. This conductor strip 71–*m* has angularly directed spring ends 72–*m* and 70–*m* located respectively in the notch 71–*mn* and projecting through the hole 71–*mh* as clips for respective engagement with a battery terminal and with the contact terminal 69–*m* on the coil C.

The preferred way of providing and mounting the conductor strip 71–*m* is to coat the surface of groove 71–*mg* with a liquid insulating composition which is curable to a strongly adhesive and essentially rigid condition: phenolformaldehyde, polyethylene and other synthetic resins are satisfactory. When the coating has attained stiffness, either by mere drying of the solvent if used or by curing to such condition, the strip 71–*m* is laid in position, and a further coating of the insulating composition is applied over it and into the spaces, if any, between the strip and the walls of groove 71–*mg*. While the parts are in such position, a final curing of the composition is effected: and thereafter the conductor strip is a monolith with the pillar plate itself, and the electrical connection is thus accomplished without the use of dangling and accidentally displaceable wires. The preferred final cross-section has a surface essentially flush with the surface of the pillar plate PP–*m*.

Opposite other terminal of electrical battery B, a contact spring 212–*m* is secured directly to the base plate, so that the base plate is maintained at the same potential as this battery terminal: and therewith all parts in electrical contacts with the base plate PP–*m* are at this potential. Thus, the balance cock BC–*m* and the hairspring stud HSD are at this potential, and current can flow through the hairspring HS to the collet RC on the balance staff BC and thus to the roller collet RC and to the contact fin 50–*m*.

As described above, current can flow from the contact fin 50–*m* through the contact blade CB to one or the other of the fixed contacts 60–*mc*, 60–*me* for a small duration of time while the balance system is passing close to the neutral axis. Current then respectively flows from the fixed contact 60–*mc* or the fixed contact 60–*me* by the corresponding blades 60–*mb*, 60–*md* to the contact strip 62–*m* and thus to the spring clip 64–*m* by which current is transferred to the terminal 65–*m* on the electrical coil C–*m*. The return from the coil C–*m* to the battery occurs by the strip 71–*m* described above.

It will be noted that the conductor strips 62–*m*, 71–*m* are respectively assembled with and solidly secured to substructures of the assembly during the course of manufacture of such assembly; that the contact system is likewise prepared in sub-assemblies, with the moving spring contact blade CB secured in the support block 55–*m* as one unit of sub-assembly, and the contact blades 60–*mb*, 60–*md* secured as another unit sub-assembly with the block 54–*m* and the conductor strip 62–*m*. The parts of the balance system are likewise capable of unit sub-assembly manufacture, so that the elements may be made individually and sub-assembled preliminary to a final assembly: and during final assembly there are no wire connections, soldered or screw joints, or uncertain adjustments to be accomplished.

In the construction shown in FIGS. 19 and 21, a core 27–*m* receives an electrical winding or coil C–*m*, and has a pole extension 20–*m* constructed and assembled by staking or adhesive in an aperture of the base plate PP–*m* (FIG. 21). This pole extension has a long leg 20–*ma* opposite but spaced from the short leg 28–*ma* of a second pole extension 28–*m* held clamped to the core 27–*m* by a screw 26–*m*. The balance wheel BW–*m* has its rim in the space between the pole legs 20–*m*, 28–*m*.

The balance wheel BW–*m* is illustrated as having a thick rim structure with an inwardly projecting flange 37–*mf* and the diametrical arm 37–*m*. The rim of the balance wheel has two diametrically opposed recesses for receiving the masses MA, MB. As it is desirable that a balance wheel makes from about 1 and 1/8th to about 1 and 1/2 turns per stroke (that is, say from 400 to 550 degrees of oscillation), it is preferred to form one of the masses MA, MB for magnetic effect, and to have the other mass of non-magnetic material: thus, the mass MA should be of material which is essentially non-magnetizable, such as brass, and may be protected if desired by a thin coating of gold or other non-magnetizable and non-corrodible material. The mass MB is a permanent magnet presenting a north pole at the top in FIG. 42, adjacent the long leg 20–*ma*, and a south pole at the bottom, adjacent the short leg 28–*ma*. The rest of the balance wheel structure, including the rim, meantime screws, should also be of non-magnetic material. It will particularly be noted that by having the masses MA and MB separate from the balance during original manufacture, and by pairing such masses against one another for equality, it is feasible to assemble such pairs diametrically opposite one another on a balance, essentially without changing an existing poise. The masses MA, MB may be held in place by a cement, preferably a thermoplastic resin.

The operation of this motor drive structure is as follows:

When the balance wheel BW–*m* is in oscillation, with the permanent magnet MB approaching the air gap between the pole pieces presented by the adjacent faces of the legs 20–*ma*, 28–*ma*, magnetic effects are being induced and this mass is thus attracted as an armature, toward a position between the legs 20–*ma*, 28–*ma*. The force thus exerted appears as impulsing energy tending to accelerate the balance wheel BW–*m*. As the balance comes to neutral axis, the assembled fin 50–*m* engages the contact blade CB and the electric circuit is closed wherewith the coil C–*m* is energized (note FIG. 24). This energization of the coil produces an opposite magnetic effect in the legs 20–*m*, 28–*m* to that which has been induced therein by the permanent magnet MB. This effect, at the standardized size of the coil and of the magnetic yoke parts and the voltage and energy received from the electrical battery B, being sufficient to override the effects of the permanent magnet, and essentially reduce the relative magnetic polarities of the legs 20–*m*, 28–*m* to zero, so that there no longer is an attraction upon the mass MB. Thus, the system operates by attracting the permanent magnet MB toward neutral axis, by the action of the pole pieces: and then reduces the magnetic effect of these pole pieces to zero, so that thereafter the balance will continue in its oscillatory motion essentially without drag from the pole pieces. When the energization of the coil C–*m* is terminated by opening the electrical circuit, the decrement of magnetic effects in the yoke occurs at such a rate that the system does not become strongly attractive until the magnetic MB has moved so far past neutral axis that there is essentially no checking of the continued movement of the balance. When the balance has come to a standstill by storage of energy in the hairspring HS, and then makes its return stroke, a similar succession of events occurs, with the magnet MB being at first attracted by the pole faces at the ends of legs 20–*m*, 28–*m*, followed by the closure of the electrical circuit by energization of the coil C–*m* so that the pole pieces become essentially of zero polarity and permit the balance to continue in its stroke.

For such a device, the coil C–*m* may have a winding of copper wire about 0.002 inch in diameter, with a direct current resistance of the order of 100 to 500 ohms.

The structure of FIGS. 20 and 22 closely corresponds mechanically to that of FIGS. 19 and 21, except that a single fixed contact 60–*mc* is employed with one resultant impulse per cycle, the mass MB is of magnetizable material of low remanence, and a permanent magnet is employed in the stator.

As shown in FIGS. 20 and 23, the permanent magnet 27–*mm* is formed with reduced end extensions which closely fit in corresponding apertures in the pole extensions 20–*m*, 28–*m*; and serves when the coil is being de-energized to maintain a magnetic effect opposite to that which was electrically induced by the coil C–*m*, and apparently then aids in dissipating the coil effect; during de-energized periods, its effect is reduced by the shunt effect of the de-energized core 27–*m*. This mass MB may be of soft iron, iron powder bonded by resin, or other material capable of magnetization and preferably having the property of quickly dissipating any induced magnetization when the inducing field disappears. The other parts of the balance, including the compensating mass MA are preferably non-magnetizable, as before.

When the balance wheel BW–*m* is in oscillation, and the mass MB approaches the air gap between the pole pieces at the ends of legs 20–*ma*, 28–*ma*, the permanent magnet 27–*mm* is shunted by the path through the core 27–*m* of the de-energized coil C–*m*, and essentially no effect is produced on the balance. As the leading edge of the mass MB comes adjacent the nearer edge of the stator parts, the fin 50–*m* engages the contact blade CB, and the circuit is closed and coil C–*m* is energized; and its magnetic field now opposes the effect of the permanent magnet 27–*mm*, and a powerful attraction is exerted upon the mass MB, thereby impulsing the balance. At this time, also, the jewel pin 51 encounters the star wheel and train movement is initiated; wherewith the balance acts as a coupling, so to speak, so that the train energy is delivered from the stator to the train essentially without storage in the balance system. As the mass MB attains a position close to that of minimum air gap in the magnetic circuit (see FIG. 20), corresponding to neutral axis of the balance assembly, the fin 50–*m* releases the contact blade (FIG. 20) and the circuit is broken, wherewith the rapid decay of the magnetic field results in little or no retarding drag upon the mass MB as the balance continues in its stroke. During the return stroke, no circuit is made, and the permanent magnet 27–*mm* is essentially shunted by the core 27–*m* as before. The effect of the permanent magnet 27–*mm* is to give a greatly increased efficiency to the motor system in such an arrangement, for example twice as great for that of a like structure without the shunting permanent magnet.

By making the contact support pieces 54–*m*, 55–*m* of conductive material, the structures of FIGS. 19 and 24, and FIGS. 20 and 22, will operate with the making and breaking occurring between the contact blade CB (which is then at base plate potential) and the side contact means.

In each case, the impulsing energy delivered into the balance system in each cycle of oscillation is by design sufficient to satisfy all frictional and other losses in the balance and train systems; and to maintain this balance at substantially steady amplitude or "turns" of oscillation such as 1 1/8th to 1 1/2 turns. This energy can be applied entirely before neutral axis, when the structure acts solely by attraction with the magnetic effect of the coil C–*m* exactly compensating the effect of the permanent magnet; or in part ahead of neutral axis by attraction, and in part behind neutral axis by repulsion.

The structure of the balance wheel BW–*m* (FIG. 19) also permits the employment of three pairs of mean-time screws 47–*m*, with the elements of each pair located diametrically opposite one another, and with each located in a recess of the balance rim, so that there is no projection of these mean-time screws, in their final adjusted position, beyond the periphery of the balance rim: while, on the other hand, the masses MB, MA project considerably beyond this rim, and always beyond the heads of the mean-time screws 47-m.

The foregoing description, and the accompanying drawings show illustrative forms of construction according to this invention, but it will be understood that these forms are not restrictive, and that the invention may be practiced in many ways within the scope of the appended claims.

We claim:

1. In a magnetic impulsing assembly, a frame, an oscillating member on the frame and having a part of magnetic material partaking in the movement thereof and moving in an arcuate path, a magnetizable core on the frame and presenting pole pieces opposite the path of said part of magnetic material, an electrical winding on said core, and a permanent magnet on the frame and presenting poles adjacent said pole pieces.

2. In a magnetic impulsing assembly, a frame, an oscillatory member on the frame and having a magnetizable mass partaking in the movement thereof and therewith oscillating in an arcuate path, a magnetizable core having spaced pole pieces between which the mass passes during the oscillations, an electrical winding around the core, and a permanent magnet with its poles adjacent said pole pieces.

3. An assembly as in claim 2, including a source of electrical energy and a contactor controlled by the oscillatory member to connect said source to said winding, said source and winding being so correlated that the field of magnetization by the winding is opposite to that of the permanent magnet.

4. In an oscillatory armature motor, an oscillating armature, an electric coil, magnetizable material of low hysteresis providing a flux path from said coil and presenting a pole piece adjacent the path of the armature, a permanent magnet having a pole connected to said pole piece, and an electric circuit including a source of electrical energy and a circuit maker effective to energize the coil and thereby conpensate the field established in the pole piece by said permanent magnet.

5. In a time-piece, a frame including a stator part of magnetizable material, a pole piece of magnetizable material mounted on said stator part, an oscillatory balance carried by the frame and having a magnetic part and oscillating therewith in an arcuate path which extends adjacent said pole piece, an electrical coil effective for varying the magnetic effect in said pole piece, said magnetic part of the balance moving past the pole piece during oscillation, said pole piece being movable on said stator part, and means for fixing said pole piece on said stator part whereby to determine the magnetic air gap between said pole piece and said magnetic part.

6. In a time-piece, a frame including a stator part of magnetizable material of low remanence, an oscillatory balance carried by the frame and having a magnetic part and oscillating therewith in an arcuate path, and a member of magnetizable material of low remanence secured to said stator part and having a core portion and a pole piece cooperative with said magnetic part at an intermediate point of said path, and an electrical coil on said core portion, said stator part having a portion providing a support for the balance and presenting said magnetizable material opposite the path of said magnetic part of the balance.

7. In a time-piece, a frame including a stator part of magnetizable material of low remanence and having a pole piece, an oscillatory balance carried by the frame and having a magnetic part and partaking in the balance oscillations and cooperative with said pole piece, conductors insulatedly secured to the frame and presenting terminal clips, and a removable member of magnetizable material of low remanence having one end for engaging said stator part having a core portion and at its other end a pole piece also cooperating with said magnetic part to complete a magnetic path, means securing one end of said magnetic part to said stator part, said clips being positioned on the frame opposite said core portion: and an electrical coil on said core portion and having terminals for engaging said clips, whereby the said member may be removed mechanically upon release of said securing means and electrically disconnected by removal of the coil from said clips.

8. A time-piece having a frame, a balance cock of magnetizable material of low remanence, an oscillatory balance supported by said frame and balance cock, diametrically opposed magnetic blocks at the periphery of said balance and fixed thereon to oscillate therewith in arcuate paths, magnetic core pieces opposite one another across the balance axis and presenting pole pieces adjacent said path for cooperation with the magnetic blocks during their oscillation, and electrical coils on said cores, said balance cock constituting a magnetic yoke connecting said cores.

9. A time-piece including a stator of magnetizable material of low remanence, an oscillatory balance pivoted in said stator and including a magnetizable portion moving with the balance in an arcuate path during balance oscillations, said stator including a core portion and a pole piece presented for cooperation with said magnetizable portion at a point of each oscillation thereof, and an electrical coil on said core portion, said stator lapping said magnetizable portion and having a large area opposite the same whereby to present a large flux path for the magnetic effects between said magnetizable portion and stator; said flux path forming with the stator, core, pole piece, magnetizable portion and the air gap between the pole piece and magnetizable portion a complete magnetic circuit.

10. In a time-piece having a frame, an oscillating element, and an elastic element cooperative therewith to determine the rate of oscillation, magnetic means for delivering impulses to the oscillating element and including a first magnetizable part on the oscillating element and carried thereby for movement in an arcuate path and a second magnetizable part secured on the frame, said magnetic parts being spaced by an air gap, and a magnetic shunt member secured on the frame and positioned adjacent said air gap for controlling the field intensity in the air gap.

11. An electrically actuated time-piece comprising a frame, a balance system on said frame including an oscillatory balance wheel having a rim with a portion of the rim of magnetizable material, said magnetizable portion moving in an arcuate path during oscillation of the balance of magnetizable material, electromagnetic means on the frame adjacent the said arcuate path and cooperative with said rim portions and including a second portion of magnetizable material movable toward and from the axis of the balance system for varying the magnetic air gap between said portions, and means for fixing the said second portion against movement on the frame.

12. An electrically actuated time-piece including a stator having a core with a pole piece, an electrical winding on said core, and an oscillatory balance mounted for movement relative to said stator, said balance including a rim of magnetizable material moving with the balance in an arcuate path during balance oscillations, said rim being positioned so that its path is adjacent to and for cooperation magnetically with said pole piece when the winding is energized, said rim having notches therein for determining the stated cooperation.

13. A time-piece as in claim 12, in which the outer periphery of the magnetizable rim passes closely adjacent the pole piece in providing a minimum air gap for magnetic flux, said notches determining a greater air gap for magnetic flux between the inner and said pole piece, and in which regulating screws are located in said notches to leave the periphery free.

14. A time-piece having a frame, a balance cock of magnetizable material of low remanence, an oscillatory balance supported by said frame and balance cock, diametrically opposed magnetic members mounted at the periphery of the balance for movement in arcuate paths during balance oscillations, magnetic stator pieces opposite one another across the balance axis for cooperation with the said magnetic members, said balance cock constituting a magnetic yoke connecting said stator pieces for providing a flux path including said yoke, stator pieces and magnetic members, and an electrical coil for creating a flux in said path.

References Cited in the file of this patent

UNITED STATES PATENTS

| | | |
|---|---|---|
| 694,546 | Hoeft et al. | Mar. 4, 1902 |
| 2,061,047 | Schweitzer | Nov. 17, 1936 |
| 2,104,283 | Webster | Jan. 4, 1938 |
| 2,650,277 | Reck et al. | Aug. 25, 1953 |
| 2,671,864 | Dargier de Saint Vaulry | Mar. 9, 1954 |
| 2,685,655 | Dargier de Saint Vaulry | Aug. 3, 1954 |